(12) United States Patent
McSheffrey et al.

(10) Patent No.: US 6,264,562 B1
(45) Date of Patent: Jul. 24, 2001

(54) E-MAIL GAMES

(75) Inventors: Brendan McSheffrey, Newtonville; Kevin Gulley, Newton, both of MA (US)

(73) Assignee: NNBBD Productions, LLC, Newton, MA (US)

( * ) Notice: Subject to any disclaimer, the term of this patent is extended or adjusted under 35 U.S.C. 154(b) by 0 days.

(21) Appl. No.: 09/193,760

(22) Filed: Nov. 17, 1998

Related U.S. Application Data

(60) Provisional application No. 60/082,911, filed on Apr. 24, 1998.

(51) Int. Cl.[7] .................................... G06F 19/00
(52) U.S. Cl. .............................. 463/42; 463/14
(58) Field of Search ................... 463/40, 41, 42, 463/14; 273/260

(56) References Cited

U.S. PATENT DOCUMENTS

| | | | |
|---|---|---|---|
| 4,372,558 | * 2/1983 | Shimamato et al. | 273/238 |
| 5,068,850 | 11/1991 | Moore | 370/85.8 |
| 5,283,856 | 2/1994 | Gross et al. | 395/51 |
| 5,346,399 | 9/1994 | Sakow | 434/201 |
| 5,479,491 | 12/1995 | Garcia et al. | 379/88 |
| 5,498,002 | 3/1996 | Gechter | 273/434 |
| 5,553,145 | 9/1996 | Micali | 380/30 |
| 5,555,346 | 9/1996 | Gross et al. | 395/51 |
| 5,629,982 | 5/1997 | Micali | 380/30 |
| 5,643,086 | 7/1997 | Alcorn et al. | 463/29 |
| 5,666,420 | 9/1997 | Micali | 380/30 |
| 5,695,400 | 12/1997 | Fennell, Jr. et al. | 463/42 |
| 5,712,914 | 1/1998 | Aucsmith et al. | 380/30 |
| 5,964,660 | * 10/1999 | James et al. | 463/1 |

OTHER PUBLICATIONS

Valverde, Andres. "ECTool". [online]. Jul. 7, 1999. [retrieved on May 25, 2000]. Retrieved from the Internet: <URL: http://www.ectool.nu/main.html>.*

"IECC Guidelines". [online]. 1995. [retrieved on May 25, 2000]. Retrieved from the Internet:<URL: wysiwyg://110/http://www.geocities.com/Colosseum/Midfield/1264/guidelines.html>.*

"IECG Quick Guide". [online]. 1994. [retrieved on May 25, 2000]. Retrieved from the Internet: <URL:http://www.iecg.org/Quick.htm>.*

"Deepfrozen". [online]. Feb. 1997. [retrieved on May 25, 2000]. Retrieved from the Internet: <URL:http://deepfrozen.tripond.com/info.html>.*

* cited by examiner

Primary Examiner—Valencia Martin-Wallace
Assistant Examiner—Julie Kasick
(74) Attorney, Agent, or Firm—Wolf, Greenfield & Sacks, P.C.

(57) ABSTRACT

An E-mail games processor includes computer software programs running on two or more computers connected through a computer network. The computer software automatically transmits, receives and processes E-mail messages containing move data for one or more games.

24 Claims, 8 Drawing Sheets

E-MAIL GAMES

RELATED APPLICATION

This application claims domestic priority under 35 U.S.C. §119(e) to provisional U.S. patent application Ser. No. 60/082,911, filed Apr. 24, 1998, incorporated herein in its entirety by reference.

BACKGROUND OF THE INVENTION

1. Field of the Invention

The present invention is related to methods and apparatus for playing games using computers and computer networks. More particularly, the invention is related to multi-player games in which players may be remotely located from each other, but in which players' computers are interconnected through a computer network.

2. Discussion of the Related Art

Multi-player games in which the players are remotely located relative to each other considerably antedates computers and computer gaming technology. For example, a form of chess game known as correspondence chess has been and continues to be quite popular. In correspondence chess, each player maintains their own chessboard containing the current status of the game. A player takes a turn by moving a piece on their chessboard, writing a letter to their opponent in which their move is set forth and mailing the letter containing the move to the opponent using the local postal authority. When the opponent receives the correspondence containing the new move, the opponent updates their own chessboard and repeats the process. Correspondence chess tends to be a leisurely and thoughtful game, owing in part to the long delays introduced by the local postal authority.

Correspondence gaming, generally, follows the above pattern of play.

In a variant on conventional correspondence chess, the players may utilize computer programs which maintain the current status of the chessboard, and which can be used by the players to perform a variety of analyses on their position. However, in this variant, the individual players must still correctly enter their opponent's and their moves into their computer program, in order to correctly maintain the status of the game. Computers can be used in similar fashion in connection with other correspondence games, as well.

In correspondence games, it is always possible for one player's game board to become out of sync with their opponent's game board, for example due to errors entering moves. For this reason, in some correspondence games, the move data is transmitted in the form of a complete diagram or listing of the current position or game board contents. Checking the complete position with each move is burdensome and time consuming, and so not always done. Producing the complete list of the current game board position is also highly subject to human error unless the game board is maintained by a computer program, as mentioned above.

In yet another variation on the theme of correspondence gaming, correspondence games can be played using electronic mail (E-mail), rather than postal mail. In principle, the game is played in the same manner as described above in connection with postal correspondence gaming. The principle advantage of correspondence gaming by E-mail is that the long delay introduced by the delivery of postal mail is generally not present in E-mail systems. E-mail gaming can be played using local area E-mail systems or the international Internet mail system.

The process of playing a game by E-mail using a computer-based game program is illustrated in FIG. 1.

A first player, referred to hereinafter as the game initiator opens a game program 101 and chooses to play a new game 103. The game initiator then selects which game to play 105, if presented with a choice of games, along with an opponent who the game initiator wishes to play against 107. The opponent selected in step 107 is referred to hereinafter as the game receiver. The game initiator then makes a move 109, saves the move data 111 in a computer file on the game initiator's computer and closes the game program 113.

Next the game initiator must transmit the move to the game receiver. To do so, the game initiator opens an E-mail program 115 and initiates a new message 117. The game initiator addresses the new message to the game receiver 119. Next, the game initiator browses 121 the files on the game initiator's computer for the file containing the move data saved in step 111. When the saved file containing the move data is found, it is attached 123 to the new E-mail message created in step 119. Finally, the game initiator sends the E-mail 125 to the game receiver.

The game receiver may, at some time after the game initiator has sent the E-mail, log on 127 to the game receiver's computer. The game receiver then opens an E-mail program 129 and checks for new E-mail 131. If E-mail containing a game move is found, then the game receiver decides whether to play the game now or later 133. If later, then the game receiver detaches and saves the move data in a computer file in a suitable directory for later use 134. If now, then the game receiver also saves the move data into a computer file in a directory 135, but for current use. Next the game receiver opens a copy of the game program 137 and loads the file containing the saved move data into the current game 139. Next, the game receiver makes a move 141 and performs a sequence of steps 143–157 identical to steps 111–125 previously performed by the game initiator. This results in an E-mail message being sent to the game initiator 157 at which point the game initiator performs steps 127–157 previously performed by the game receiver. This process repeats itself until the game is completed.

In another form of multi-player computer gaming, a server communicates with a plurality of client programs running on the individual player's machines. Examples of such systems are the Internet-based gaming systems of Yahoo!® and the Microsoft® Hearts game available under the Microsoft Windows™ operating system. A disadvantage of such server-based games is that all players must be available to play at the same time. In contrast, correspondence games permit each player to analyze their position and make moves at any time which they find convenient to do so.

Other problems with conventional gaming systems are related to the manual data transfer needed to obtain move data or load move data into the game software. The procedures to do this are frequently tedious and time consuming, as well as being significantly error prone. Server-based games often require special client software, in order to connect to the server, as well as requiring a network connection to the server for the duration of game play.

SUMMARY OF THE INVENTION

The present invention provides improved methods and apparatus for playing games using computers and computer networks.

The present invention may be embodied in a computer-implemented method of playing a game. The method includes receiving into an E-mail inbox, a message including an encapsulated move data packet; scanning the inbox to identify the message including the encapsulated move data packet; and indicating to a user that the message including the encapsulated data packet has been received.

The present invention may alternately be embodied in a method of playing a game with a remote opponent, using a game application program. The method includes: entering a move into the game application program; generating in the game application program move data; encapsulating the generated move data; attaching the encapsulated move data to an E-mail message; and, sending the E-mail message to the remote opponent.

According to another aspect of the invention, the invention may be embodied in a method of playing a game with a remote opponent, using a game application program. The method includes: receiving into an E-mail inbox from the remote opponent an E-mail message including an encapsulated move data packet; scanning the inbox to identify the E-mail message including the encapsulated move data packet; and launching the game application program with move data from the encapsulated move data packet.

According to several other aspects of the invention, the invention may be embodied in a computer software product. A computer software product including a computer-readable medium may embody the invention. The medium may have fixed therein a sequence of computer instructions directing steps of: receiving into an E-mail inbox, a message including an encapsulated move data packet; scanning the inbox to identify the message including the encapsulated move data packet; and indicating to a user that the message including the encapsulated move data packet has been received.

The invention may be embodied in another computer software product including a computer-readable medium in which is fixed a game application program for playing a game with a remote opponent. The game application program includes a sequence of computer instructions directing steps of: entering a move into the game application program; generating in the game application program move data; encapsulating the generated move data; attaching the encapsulated move data to an E-mail message; and sending the E-mail message to the remote opponent.

The invention may be embodied in yet another computer software product including a computer-readable medium in which is fixed a game application program for playing a game with a remote opponent. In this embodiment, the game application program includes a sequence of computer instructions directing steps of: receiving into an E-mail inbox from the remote opponent an E-mail message including an encapsulated move data packet; scanning the inbox to identify the E-mail message including the encapsulated move data packet; and launching the game application program with move data from the encapsulated move data packet.

Finally, the invention may be embodied in a game playing system, comprising: a plurality of computers interconnected by a communications network; an E-mail system operating over the network between the plurality of computers; a game program, running on at least one of the plurality of computers, and the game program communicating with the E-mail system to send and receive data attached to E-mail messages.

BRIEF DESCRIPTION OF THE DRAWINGS

In the Figures, in which like reference designations indicate like elements.

DETAILED DESCRIPTION

The present invention will be better understood upon reading the following detailed description of an embodiment thereof, in connection with the accompanying drawings.

Figure 1A:
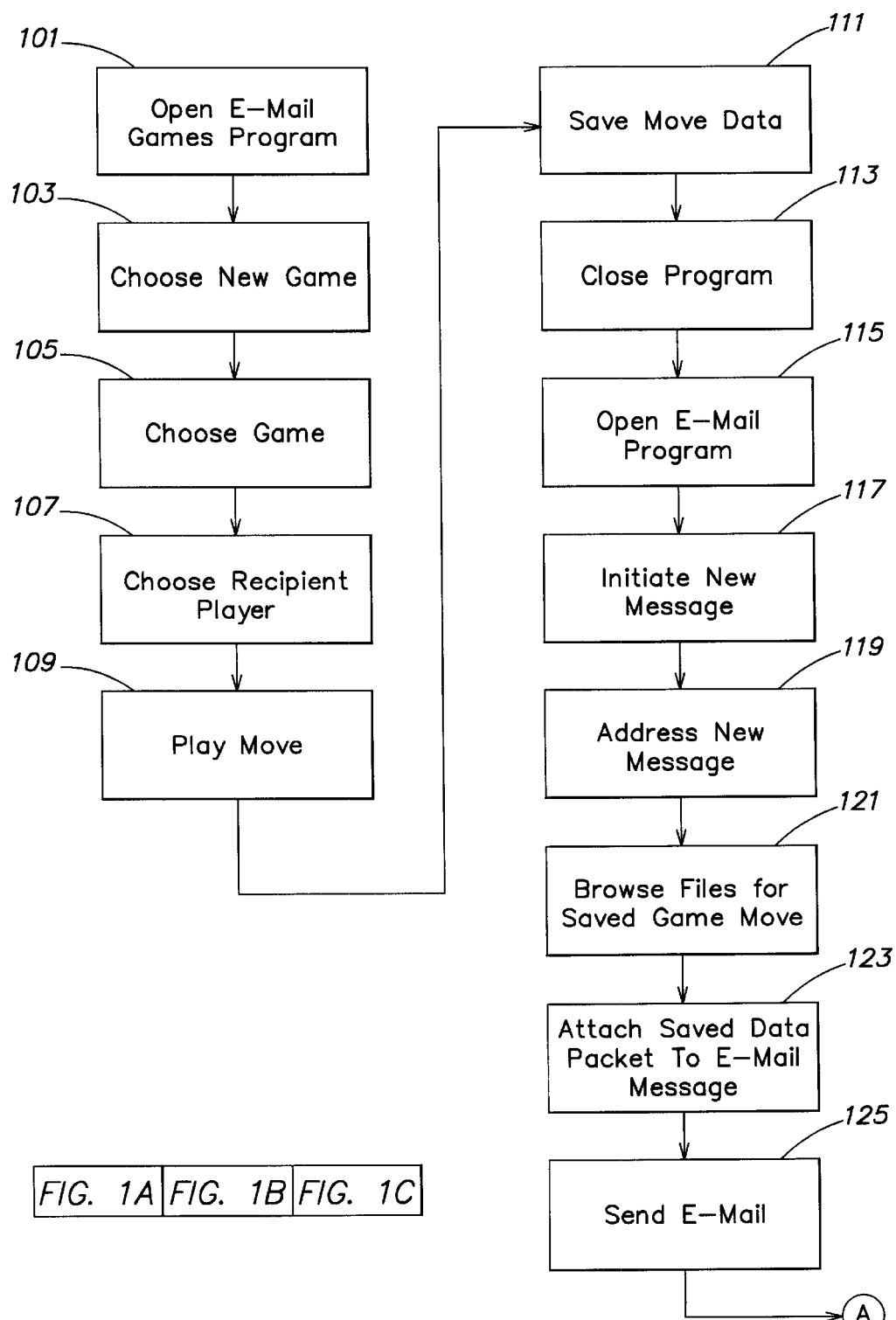
FIG. 1 is a flow chart of a conventional correspondence game process.
Figure 1B:
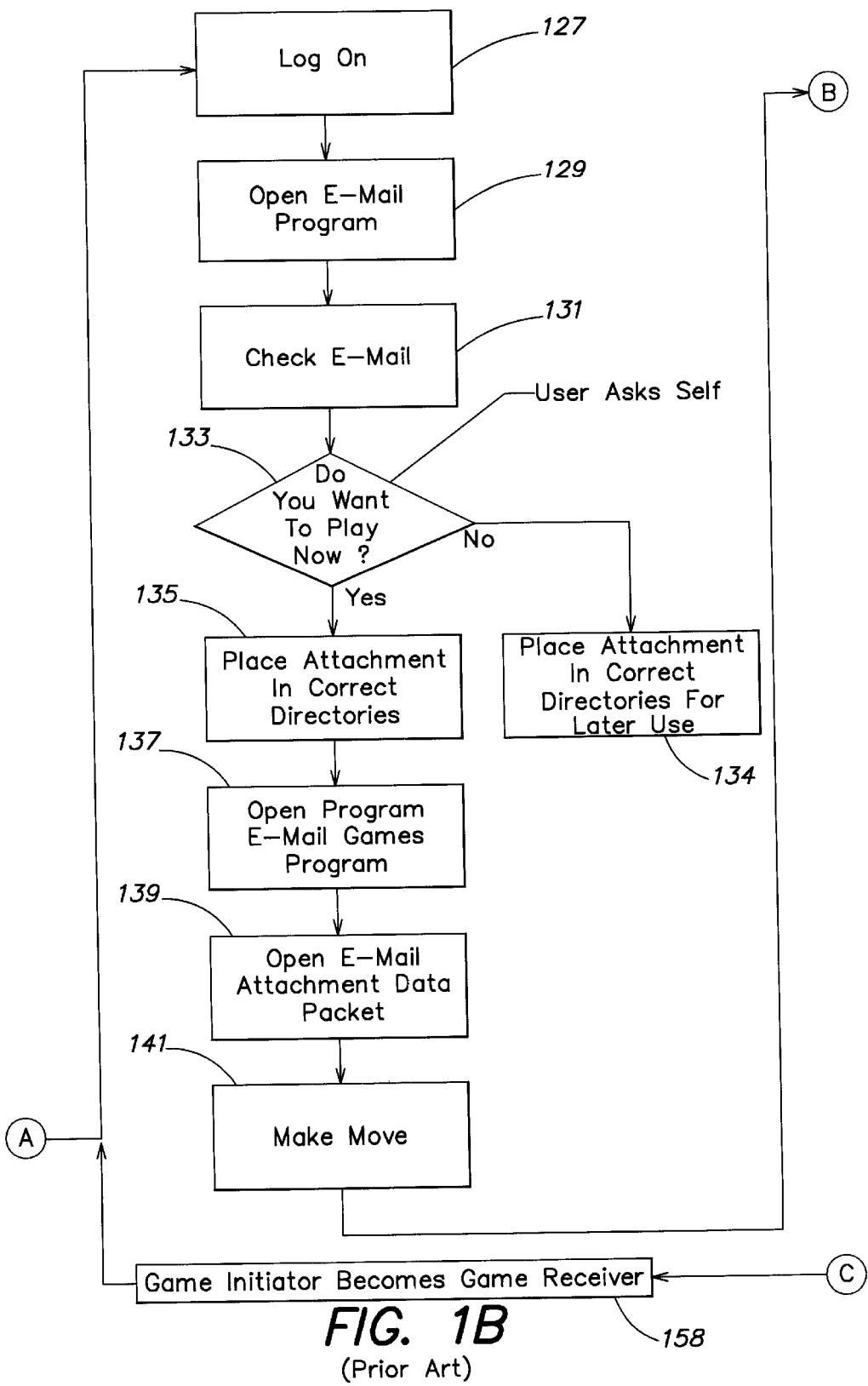
Figure 1C:
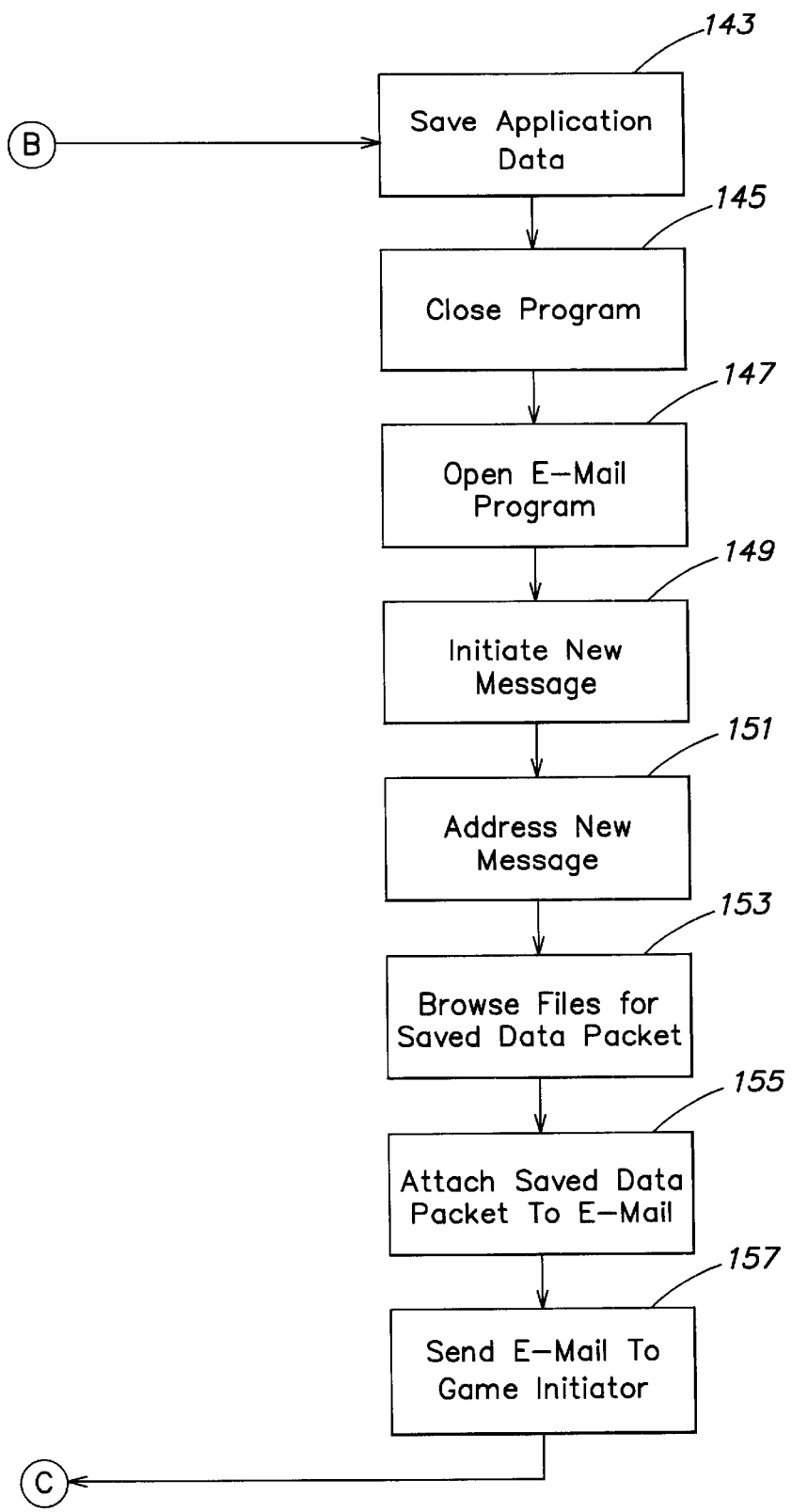
Figure 2:
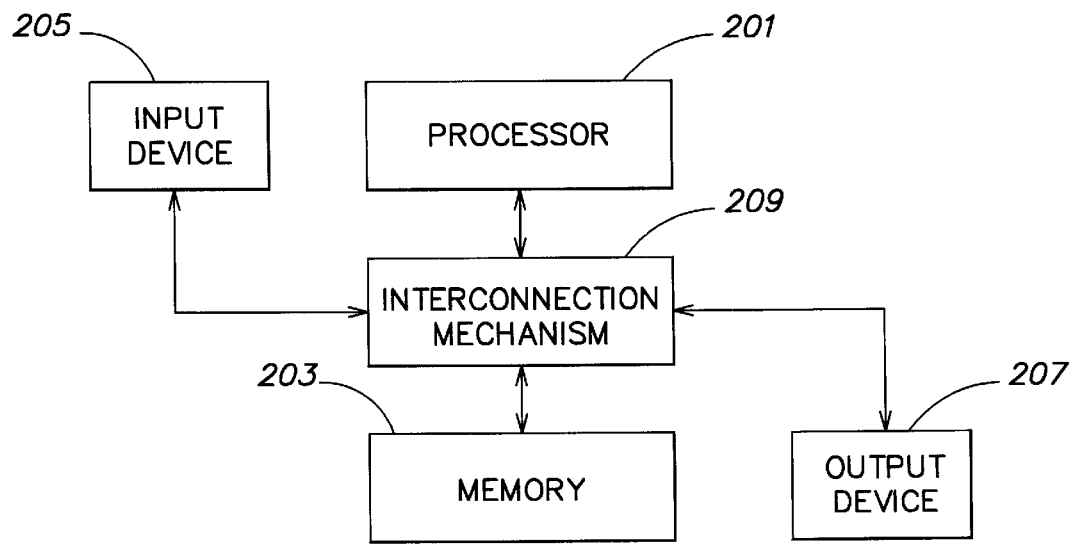
FIG. 2 is a block diagram of a data processing system on which the invention may be realized.

The exemplary system now described is embodied as a combination of one or more hardware elements which operate in response to instructions contained in one or more software programs. The hardware elements include data processing elements such as shown in FIG. 2, for example. The system of FIG. 2 may be realized in one or more personal computers (PCS) connected to a computer network, for example.

A typical data processing system includes a processor 201, memory 203 in which data and instructions are stored, one or more input devices 205 and one or more output devices 207, all communicating through an interconnection mechanism 209. Input devices 205 may include, but are not limited to keyboards and pointing devices, such as mice. Output devices 207 include printers, modems and monitors, among others. Processor 201 may be a single-chip microprocessor, a single-board computer a digital signal processing chip or a variety of other devices known to those skilled in this art. The entire system of FIG. 2 may be realized in a personal computer (PC), a mini-computer or a mainframe computer, for example. Motorola 680X0 processors, Intel Pentium processors and others may be used.

Figure 3:
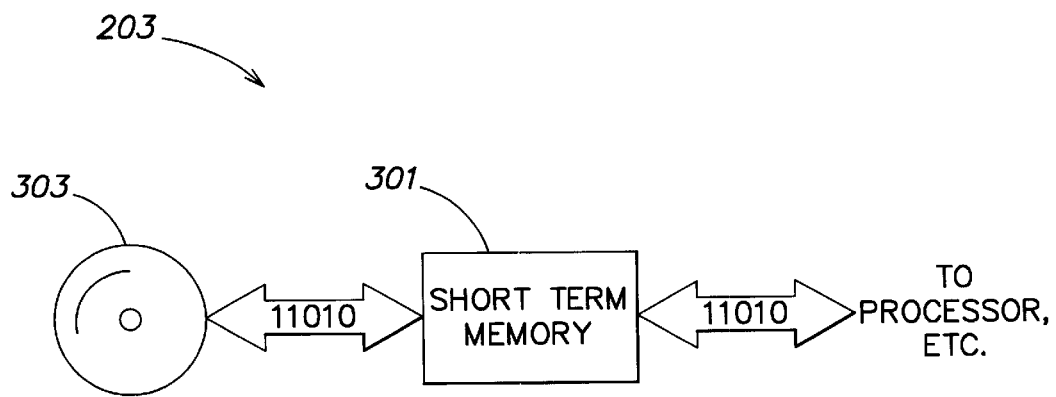
FIG. 3 is a detailed block diagram showing the memory of the system of FIG. 2.

In any of the variations described above, memory 203 may be realized as shown in FIG. 3. Memory 203 conventionally includes a long-term storage device, such as disk 303 and a short-term storage device, such as short-term memory 301. Short-term memory 301 may be realized as dynamic random-access memory (DRAM), static RAM (SRAM), or other suitable forms which are known to those skilled in this art. long-term memory 303 may alternatively be realized as programmable read-only memory (PROM), electrically alterable read-only memory (EAROM), electrically erasable ROM (EEROM), or other suitable forms which are also known to those skilled in this art.

In most conventional arrangements, processor 201 does not communicate data and instructions directly with disk 303, but rather data and instructions from disk 303 are stored temporarily in short-term memory 301 for quick access by processor 201.

Software programs control the operation of the hardware shown in FIGS. 2 and 3 to perform useful functions, such as those performed by systems constructed in accordance with various aspects of the present invention. One skilled in the art will select a suitable programming language to meet their design criteria.

The software programs which control the operation of the hardware shown in FIGS. 2 and 3 are comprised of sequences of instructions fixed in a computer-readable medium, such as disk 303. Each program may be stored on one or more disks 303. The disk may be packaged and sold or their contents licensed, for example in a conventional retail setting, or the disks 203 may be remotely accessed through a network and their contents downloaded to individual users. The disks 303 may be CD-ROMs, rewritable CDS, magnetic disks, other optical disks, or other storage technologies. Instead of disks, the long-term storage medium in which the software program instructions are fixed can be other substantially non-volatile storage, such as flash ROM devices, etc.

The present invention is realized in a system in which two or more systems, e.g., PCS, such as shown in FIG. 2, are connected together in a computer network. For purposes of the following discussion, a computer network includes two or more computers connected together for electronic communication therebetween using one or more of a variety of software programs. Examples of networks which can be used in connection with the present invention include the Internet, local area networks, wide area networks, etc. The following discussion assumes that the users of the network have electronic mail software operating on computers on which the invention is used.

Software for this exemplary embodiment of the invention generally consists of two software programs. The first is referred to as the game master program while the second is referred to as the game receiver program. The software can be partitioned differently, for example into more software programs or software program modules, as may be required for any particular design.

The game master program is responsible for carrying out instructions which generate a new game, generate move data corresponding to moves made by the game initiator and for processing moves received from the game receiver.

The game receiver program is responsible for displaying to the receiver the current game board, showing the status of the game, as well as for generating move data representing moves made by the game receiver.

Figure 4:
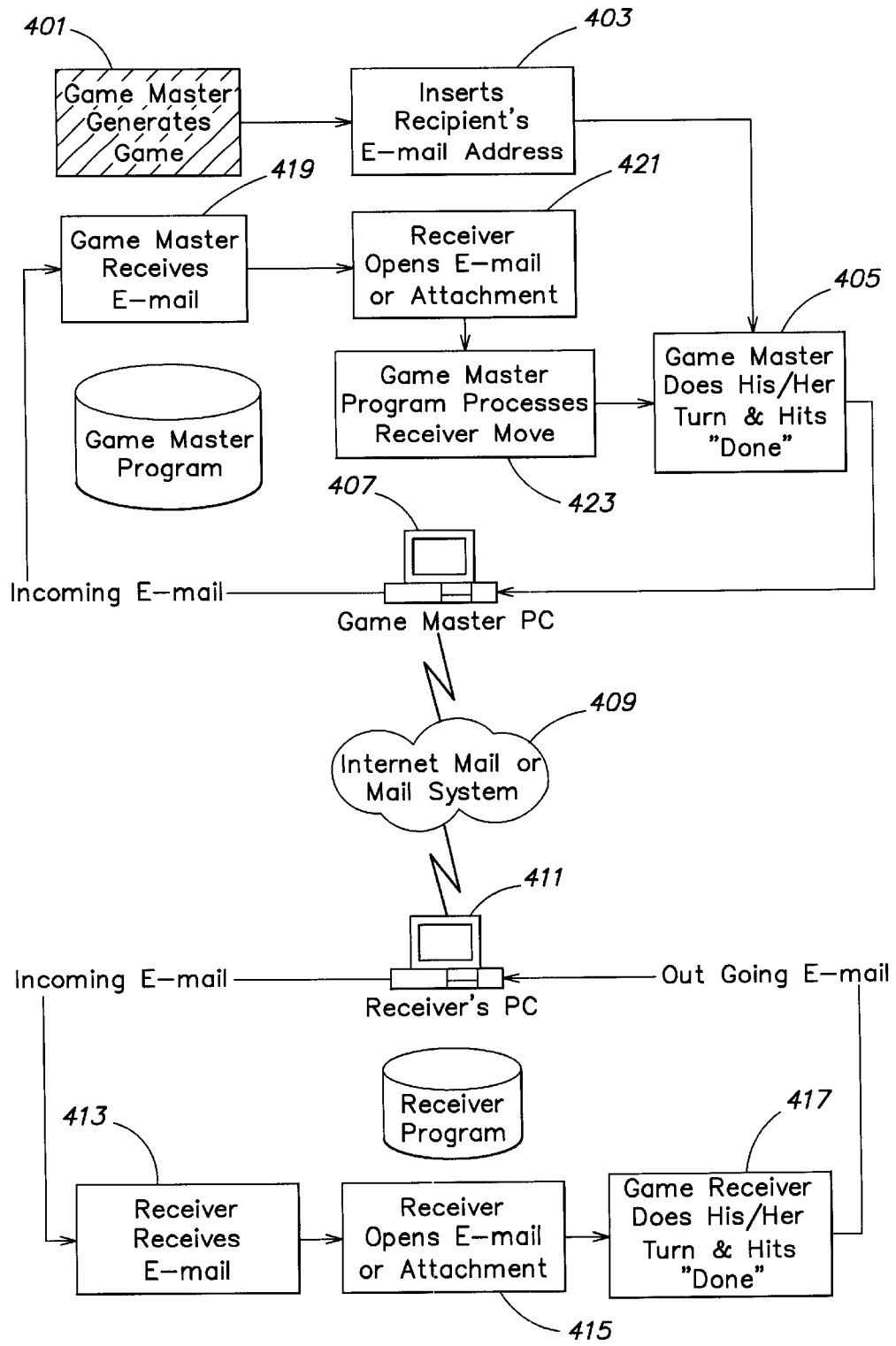
FIGS. 4, 5 and 6 are flow charts of game processes according to aspects of the claimed invention.

An overview of game play is now given in connection with FIG. 4.

A game player referred to hereinafter as the game master uses the game master program running on a PC to generate a new game to play, at step 401, for example a chessboard at opening position. The game master then selects an opponent, referred to hereinafter as the game receiver, and supplies the game master program with the game receiver's E-mail address at step 403. Then the game master takes a turn by indicating in the program a move or play to be made and indicates that the turn is complete, for example by striking a "done" key, step 405. The game master program, running on the game master's PC 407 then places move data into the electronic mail stream transmitted through the computer network 409 to the game receiver's PC 411. The game receiver receives the E-mail message containing the move data at step 413. The game receiver program then automatically opens the E-mail containing the move data at step 415. The game receiver program then permits the game receiver to take a turn and indicate that the turn is complete by hitting a "done" button, step 417. The game receiver's move data is then placed by the game receiver's PC 411 into the electronic mail stream of the computer network 409, back to the game master's PC 407. The game master then receives the game receiver's move data as E-mail at step 419. The game master program then opens the E-mail containing the move data at step 421 and processes the game receiver's move at step 423. Finally, the process begins again with the game master taking a turn at step 405.

Figure 5A:
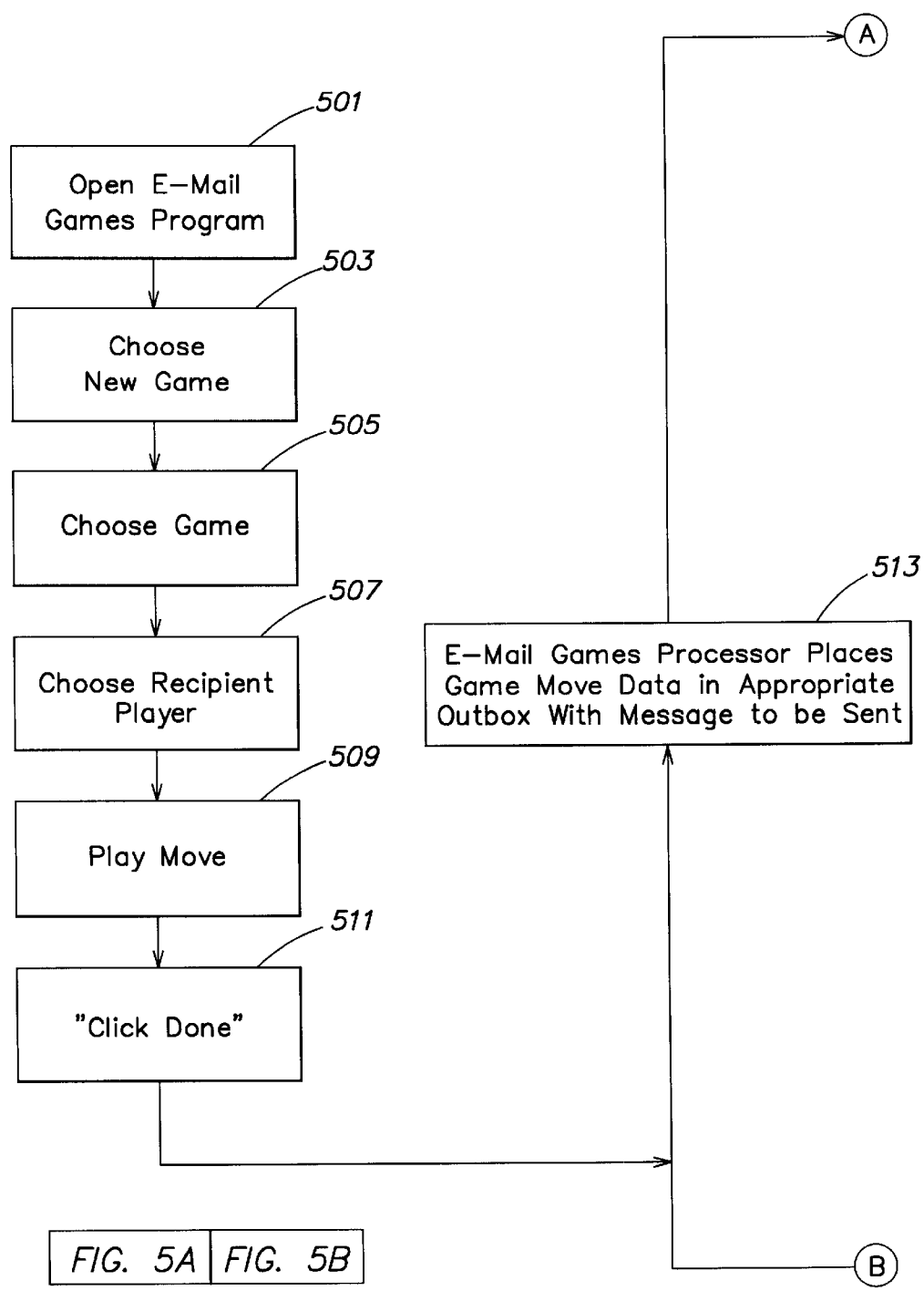
Figure 5B:
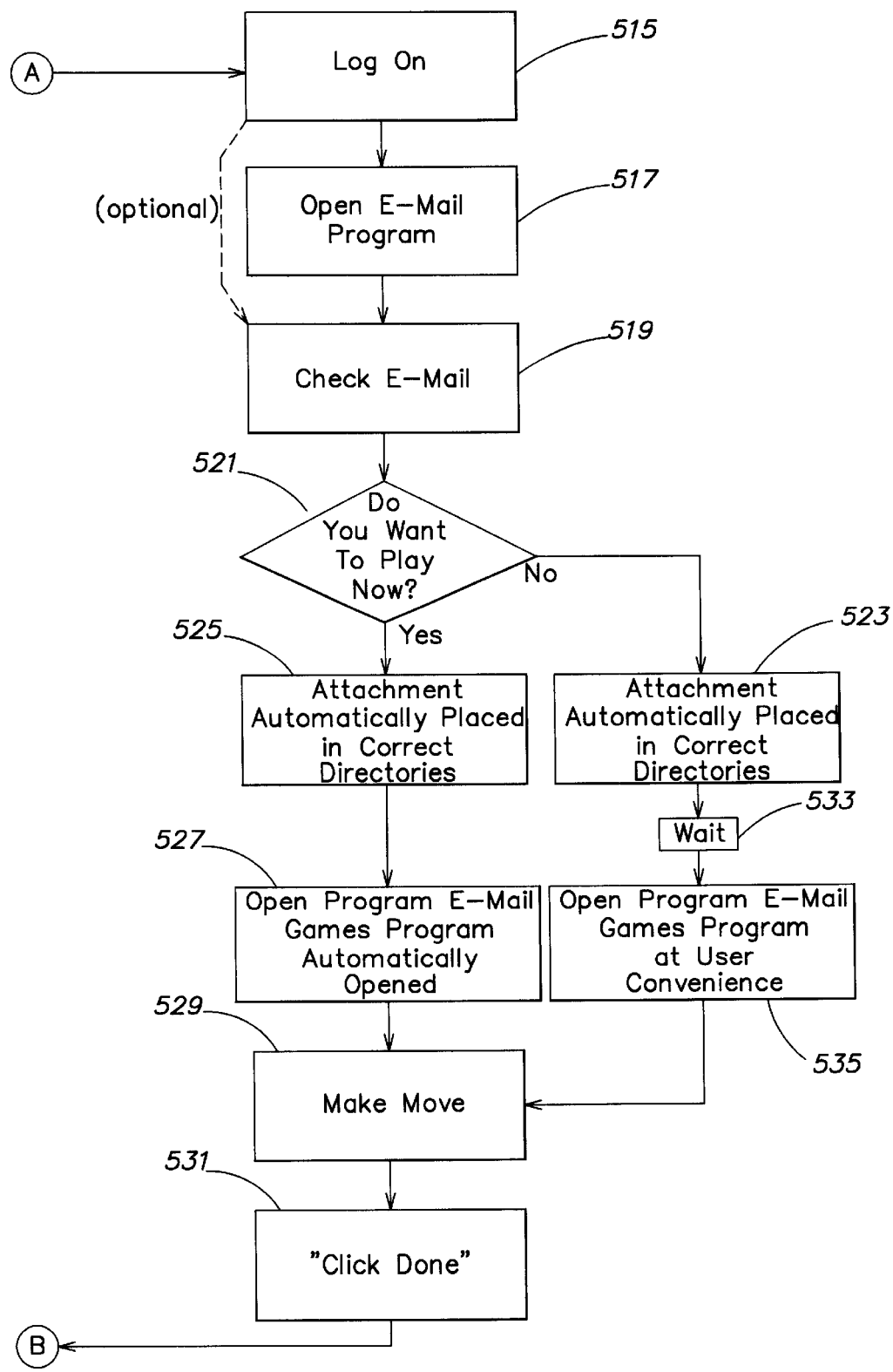

The process described above in connection with FIG. 4 is now described in somewhat more detail in connection with FIG. 5.

Play begins with the game master launching on the game master's PC, the game master program step 501. At step 503, the game master chooses to play a new game. The game master then chooses at step 505 the game to play, for example a game of chess. The game master also selects an opponent, referred to as the game receiver, step 507, and enters the game receiver's E-mail address into the game master program, if not already entered. The game master then makes a move or play in the game at step 509, and indicates that the move is complete at step 511, for example by clicking a "done" button.

At this point, the game master program, step 513, formats the move data as an E-mail message or an attachment to an E-mail message and places the E-mail message containing the move data into the game master's E-mail out box for sending at the next regular time when the game master would ordinarily send E-mail.

When the game receiver logs on to the game receiver's PC at step 515 and opens the game receiver's E-mail program at step 517, any new E-mail message containing a move for a game will be in the game receiver's in box. The game receiver program then checks the game receiver's in box for E-mail containing such a message including move data at step 519. The game receiver program can track the E-mail at step 519 without the game receiver having opened the E-mail program (step 517), by directly accessing the database, file or file directory in which the game receiver's E-mail in box is located. The game receiver program then presents the game receiver with a choice of whether to play now or later, at step 521. If the game receiver elects to play the game later, then the game receiver program automatically places the move data into a suitable directory from which it can be retrieved when the game receiver decides to play the game. If the game receiver elects to play the game now at step 521, then the move data is automatically placed into a directory from which it can be immediately retrieved by the game receiver program, step 525. The game receiver program then automatically launches at step 527 a program or module for playing the particular game to which the move data relates. The game receiver then has an opportunity to make a move at step 529. When the game receiver's move is complete, then the game receiver so indicates at step 531, for example by clicking on a "done" button. The game receiver program then performs step 513, as described above, creating an E-mail message containing the game receiver's move data and addressed to the game master. The process then repeats with the game master and the game receiver alternately performing steps 515–531 until the game is complete.

Figure 6:
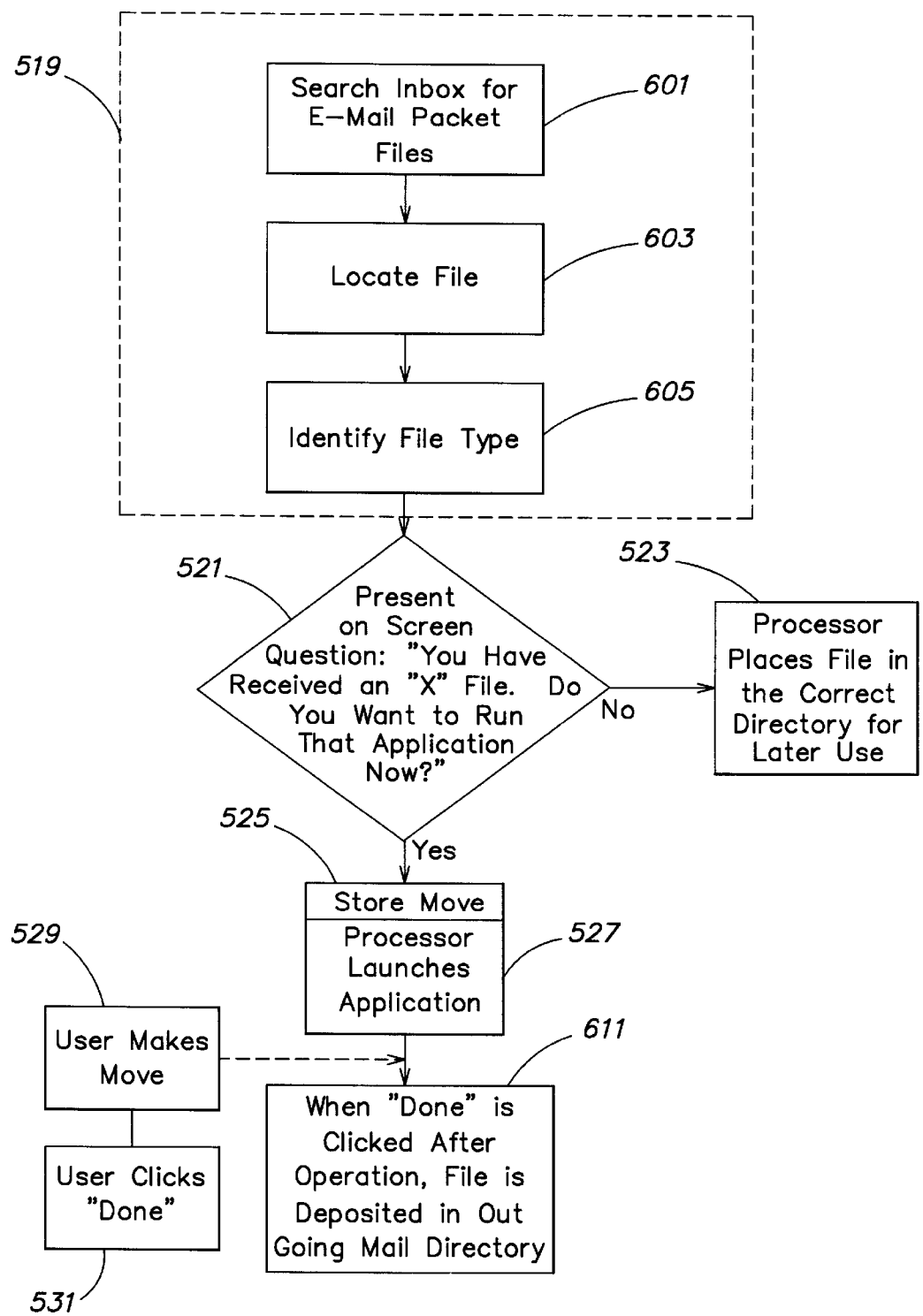

Finally, steps 519–531 are described in somewhat more detail in connection with FIG. 6.

The game receiver program or game master program executing step 519 to check an E-mail in box first searches the in box for a message containing move data at step 601. The extent of the move data file is determined and located at step 603. Finally, at step 605 the type of move data is identified, so that the appropriate game program or module can be launched. At step 521, as explained above, the user is presented with a question as to whether to play the game now or later. The program then stores the move data at step 525 or step 523, according to the input provided by the user. If the game is to be played now, then the program launches the game application or module at step 527. Finally, after the user clicks on a "done" button or otherwise indicates that the user has made a move in step 529, then the new move data is deposited in the user's E-mail out box, in the form of an outgoing E-mail message, at step 611.

The present invention has now been described in connection with a number of specific embodiments thereof.

However, numerous modifications which are contemplated as falling within the scope of the present invention should now be apparent to those skilled in the art. Therefore, it is intended that the scope of the present invention be limited only by the scope of the claims appended hereto.

What is claimed is:

1. A computer-implemented method of playing a game, comprising steps of:

receiving into an E-mail inbox, a message including an encapsulated move data packet, the encapsulated move data defining a move made by one player of the game, scanning the inbox using a software process executing on a computer, wherein the software process identifies as part of the game the message including the encapsulated move data packet; and indicating to a user after scanning the inbox, that a message identified as part of the game has been received.

2. The method of claim 1, the step of indicating further comprising:

offering to launch a game program with move data from the encapsulated move data packet, responsive to the software process identifying as part of the game the message including the encapsulated move data.

3. The method of claim 2, further comprising:

simultaneous with the step of offering, displaying the message with which the encapsulated move data packet is included.

4. The method of claim 1, further comprising:

storing data from the encapsulated move data packet in a location accessed by a game application program with which the move data is associated.

5. The method of claim 1, further comprising a step of:

launching a game program with move data from the encapsulated move data packet, responsive to the software process identifying as part of the game the message including the encapsulated move data.

6. The method of claim 5, further comprising:

processing the move data using the game program;

generating response move data;

encapsulating the response move data;

attaching the encapsulated response move data to a response E-mail message; and sending the response E-mail message.

7. A method of playing a game with a remote opponent, using a game application program, the method comprising steps of:

entering a move into the game application program;

generating in the game application program move data;

encapsulating the generated move data;

attaching the encapsulated move data to an E-mail message;

depositing the E-mail message in an E-mail client program outbox;

sending the E-mail message to the remote opponent;

receiving into an E-mail inbox from the remote opponent an E-mail message including an encapsulated move data packet;

scanning the inbox using a software process executing on a computer, wherein the software process identifies as part of the game the E-mail message including the encapsulated move data packet; and launching the game application program with move data from the encapsulated move data packet, responsive to the software process identifying as part of the game the message including the encapsulated move data.

8. A method of playing a game with a remote opponent, using a game application program, the method comprising steps of:

receiving into an E-mail inbox from the remote opponent an E-mail message including an encapsulated move data packet;

scanning the inbox using a software process executing on a computer, wherein the software process identifies as part of the game the E-mail message including the encapsulated move data packet; and launching the game application program with move data from the encapsulated move data packet, responsive to the software process identifying as part of the game the message including the encapsulated move data.

9. The method of claim 8, further comprising steps of:

prior to the step of launching, offering to temporarily forgo launching the game application.

10. The method of claim 9, further comprising a step of:

simultaneous with the step of offering, displaying the message with which the encapsulated move data packet is included.

11. The method of claim 8, further comprising a step of:

storing move data from the encapsulated move data packet in a location accessed by the game application.

12. A computer software product including a computer-readable medium in which is fixed a sequence of computer instructions directing steps of:

receiving into an F-mail inbox, a message including an encapsulated move data packet;

scanning the inbox using a software process executing on a computer, wherein the software process identifies as part of a game the message including the encapsulated move data packet; and indicating to a user that a message identified as part of the game has been received.

13. The computer software product of claim 12, further comprising instructions directing steps of:

offering to launch a game program with move data from the encapsulated move data packet, responsive to the software process identifying as part of the game the message including the encapsulated move data.

14. The computer software product of claim 13, further comprising instructions directing steps of:

simultaneous with the step of offering, displaying the message with which the encapsulated move data packet is included.

15. The computer software product of claim 12, further comprising instructions directing steps of:

storing move data from the encapsulated move data packet in a location accessed by a game program with which the move data is associated.

16. The computer software product of claim 12, further comprising instructions directing steps of:

launching a game program with move data from the encapsulated move data packet, responsive to the software process identifying as part of the game the message including the encapsulated move data.

17. The computer software product of claim 16, further comprising instructions directing steps of:

processing the move data using the game program;

generating response move data;

encapsulating the response move data;

attaching the encapsulated response move data to a response E-mail message; and sending the response E-mail message.

18. A computer software product including a computer-readable medium in which is fixed a game application program for playing a game with a remote opponent from whom an E-mail message including an encapsulated move data packet is received, including a sequence of computer instructions directing steps of:

entering a move into the game application program;

generating in the game application program move data;

encapsulating the generated move data;

attaching the encapsulated move data to an E-mail message;

depositing the E-mail message in an E-mail client program outbox;

sending the E-mail message to the remote opponent;

receiving into an E-mail inbox from the remote opponent an E-mail message including an encapsulated move data packet;

scanning an E-mail inbox for an E-mail message including an encapsulated move data packet from the remote opponent using a software process executing on a computer, wherein the software process identifies as part of the game the E-mail message including the encapsulated move data packet; and launching a game playing portion of the game application program with move data from the encapsulated move data packet, responsive to the software process identifying as part of the game the message including the encapsulated move data.

19. A computer software product including a computer-readable medium in which is fixed a game application program for playing a game with a remote opponent, including a sequence of computer instructions directing steps of:

receiving into an E-mail inbox from the remote opponent an E-mail message including an encapsulated move data packet;

scanning the inbox using a software process executing on a computer, wherein the software process identifies as part of the game the E-mail message including the encapsulated move data packet; and launching the game application program with move data from the encapsulated move data packet, responsive to the software process identifying as part of the game the message including the encapsulated move data.

20. The computer software product of claim 19, further comprising instructions directing steps of:

prior to the step of launching, offering to temporarily forgo launching the game application.

21. The computer software product of claim 20, further comprising instructions directing steps of:

simultaneous with the step of offering, displaying the message with which the encapsulated move data packet is included.

22. The computer software product of claim 19, further comprising instructions directing steps of:

storing move data from the encapsulated move data packet in a location accessed by the game application.

23. A game playing system, comprising:

a plurality of computers interconnected by a communications network;

an E-mail system operating over the network between the plurality of computers; and a game program, running on at least one of the plurality of computers, the game program performing steps of:
 receiving a move into the game program;
 generating in the game program move data;
 encapsulating the generated move data;
 attaching the encapsulated move data to an E-mail message; and
 depositing the E-mail message in an E-mail client program outbox the E-mail client program sending the E-mail message to the remote opponent; and another game program executing on another one of the plurality of computers, the other game program performing steps of:
 scanning the inbox using a software process executing on another one of the plurality of computers, wherein the software process identifies as part of the game the E-mail message including the encapsulated move data packet; and
 launching a game playing portion of the game program with move data from the encapsulated move data packet, responsive to the software process identifying as part of the game the message including the encapsulated move data.

24. The system of claim 23, further comprising:

a game master program capable of initiating a game with a remote opponent.

* * * * *